Figure 1:
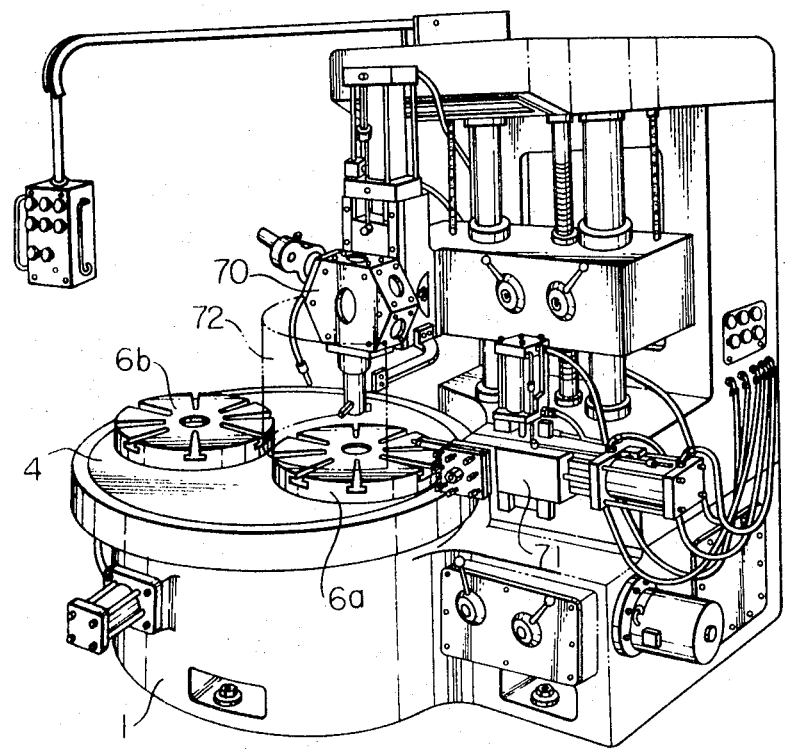

United States Patent [19]
Sato

[11] 3,742,791
[45] July 3, 1973

[54] LATHE
[75] Inventor: Kenji Sato, Ishikawa-ken, Japan
[73] Assignee: Yoshizo Kitano, Nagoya-shi, Aichi-ken, Japan
[22] Filed: Mar. 15, 1971
[21] Appl. No.: 124,392

[30] Foreign Application Priority Data
Mar. 19, 1970 Japan.............................. 45/22664

[52] U.S. Cl........................ 82/2 D, 29/38 A, 82/2.5
[51] Int. Cl................................................. B23b 3/10
[58] Field of Search..................... 82/2 D, 2.5, 36 A; 29/38; 74/813 L

[56] References Cited
UNITED STATES PATENTS
3,283,625  11/1966  Smith................................... 82/2 D
3,618,427  11/1971  Schoepe............................ 74/813 L
3,545,317  12/1970  Shultz et al........................ 82/36 A Primary Examiner—Leonidas Vlachos
Attorney—Robert E. Burns and Emmanuel J. Lobato

[57] ABSTRACT

A lathe having multiple face plates disposed on a turn table at constant center angular intervals about the axial center of the turn table with at least one of them being in a cutting station and the remaining face plates being in stand-by stations for replacement of a cut work or works with a new work or works, which turn table turns by a prescribed turning angle so as to bring the new work upholding face plate or plates into the cutting station when one cycle cutting operation is completed.

8 Claims, 12 Drawing Figures

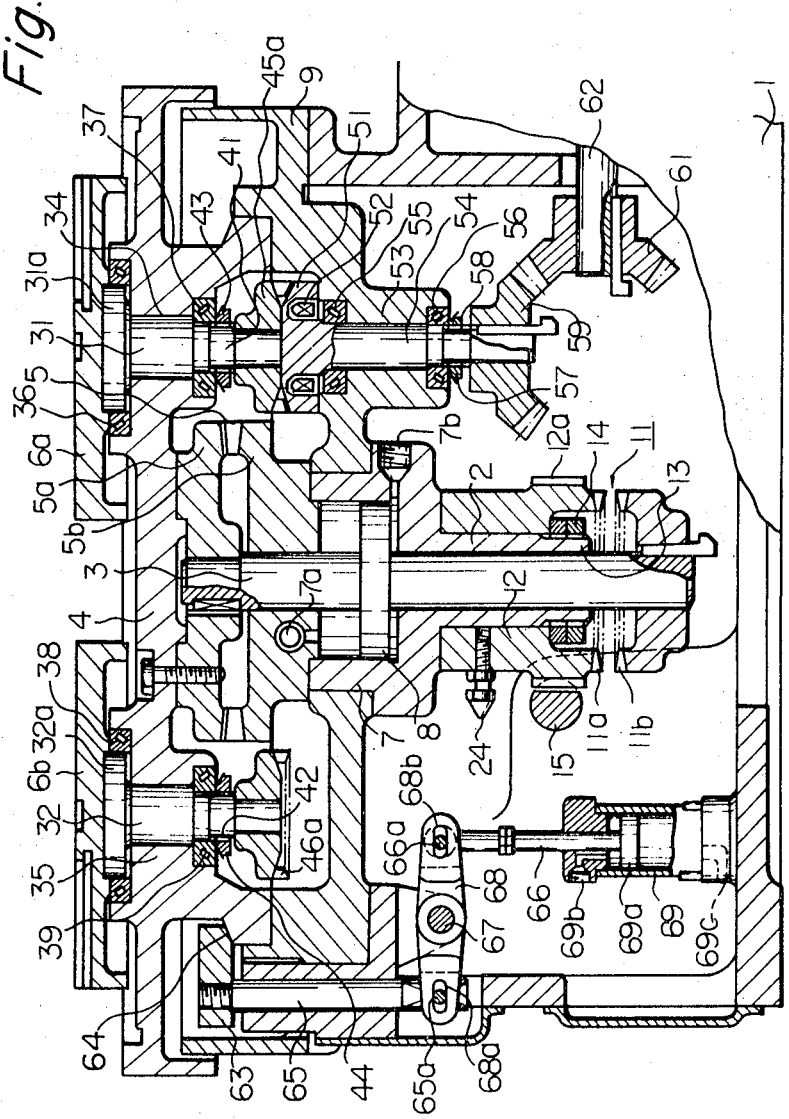

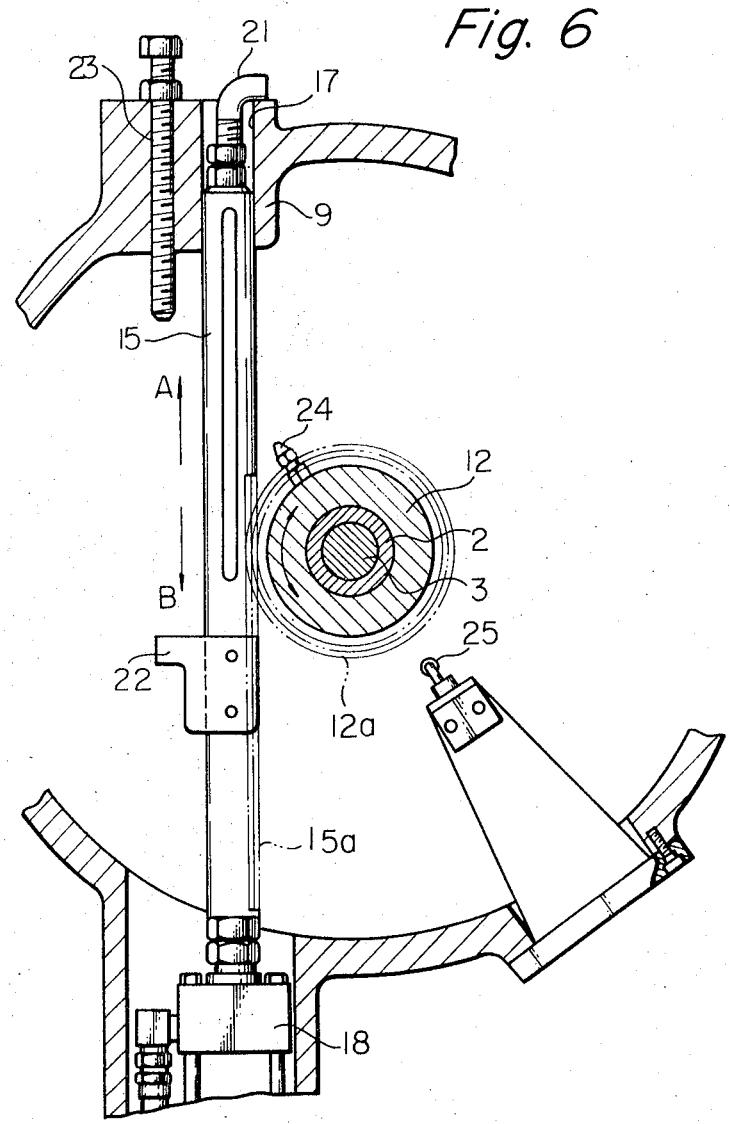

LATHE

The present invention relates to an improved lathe, and more particularly relates to a lathe whereon a cutting operation is carried out concurrently with work replacement.

In the case of the conventional lathes of various types, a workpiece or cut work must be removed from a face plate or a chuck of a head stock after one cycle cutting operation is finished and this removal of the cut work must be followed by a mounting of a new work. During this replacement of the works, the cutting operation must be interrupted. This interruption of the cutting operation reduces the efficiency of the cutting operation. Further, when multiple lathes are supervised by a single operator, increase in the shut down time of the lathes, whereon the work must be replaced, reduce of the efficiency of the operation. In order to increase the efficiency of the operation, it is necessary to reduce the number of lathes per operator, which is against the recent general trend of reducing the number of manual operations per work product.

The present invention proposes increasing the efficiency in the cutting operation by increasing the number of machines per operator. In order to attain these objects, the inventional art is based on a concurrent prosecution of cutting operation with replacement of work or works with a new work or works.

In the lathe of the present application, multiple face plates are disposed on a turn table at constant center angular intervals with respect to an axial center of the turn table, at least one face plate being in a cutting station and the remaining face plate or plates being in a stand-by station or stations for replacement of a cut work or works with a new work or works. After one cycle cutting operation is completed, the turn table turns by a prescribed turning angle and a new face plate or plates upholding the new work or works moves into the cutting station or stations.

Figure 2:
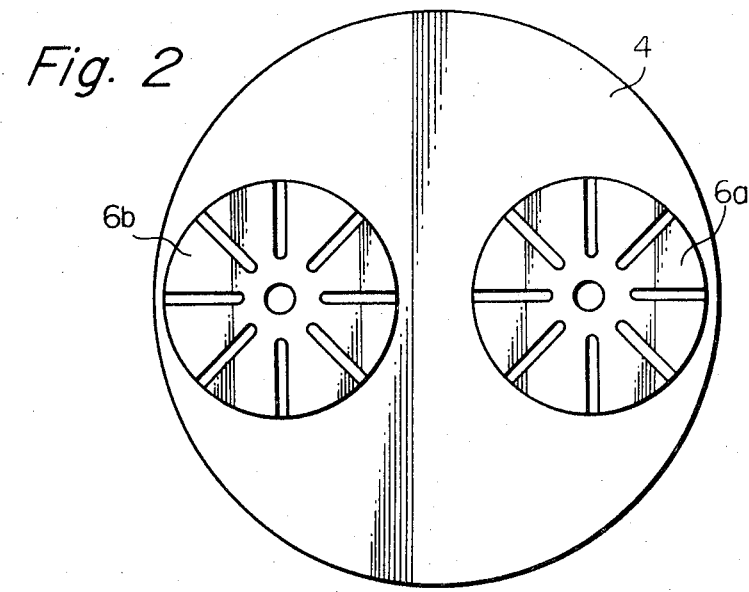
Figure 3:
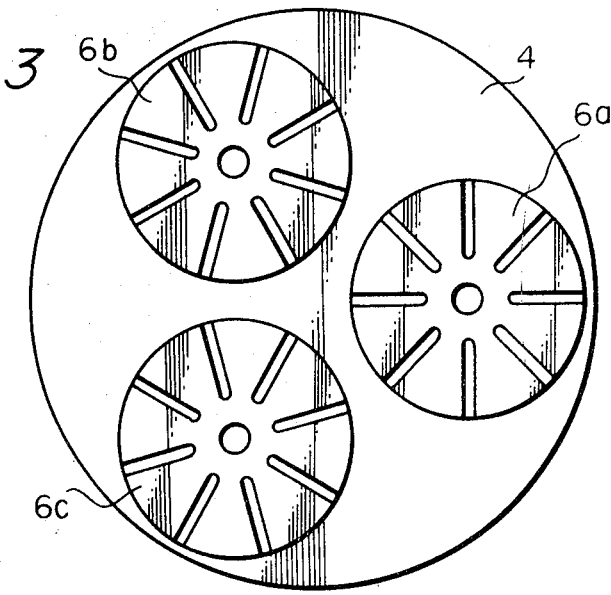
Figure 5A:
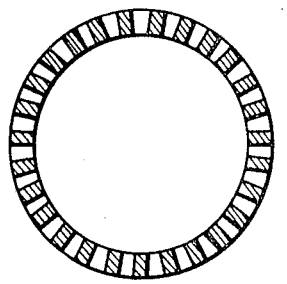
Figure 5B:
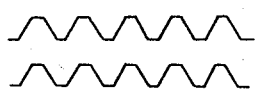

Further features and advantages of the present invention will be made more apparent from the ensuing description, reference being made to the accompanying drawings, wherein:

FIG. 1 is an entire perspective view of the inventional turret lathe embodied in the form of a vertical turret lathe, FIG. 2 is a plan view of a turn table with two face plates used for the lathe shown in FIG. 1, FIG. 3 is a plan view of a turn table with three face plates used for the lathe shown in FIG. 1, FIG. 4 is an enlarged sectional view of an internal structure of the head stock of the lathe shown in FIG. 1, FIG. 5A is a plan view of a coupling face of clutch gears used in the arrangement shown in FIG. 4, FIG. 5B is an explanatory side view of teeth of the clutch gears shown in FIG. 5A, FIG. 6 is an explanatory plan view of the turn table rotation effecting mechanism used in the lathe shown in FIG. 1

Figure 7:
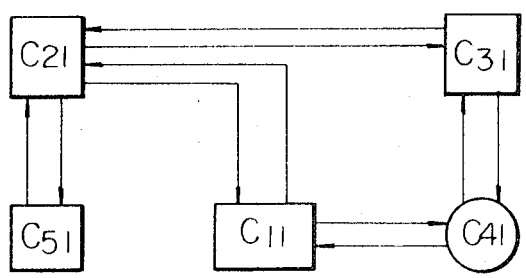
Figure 8:
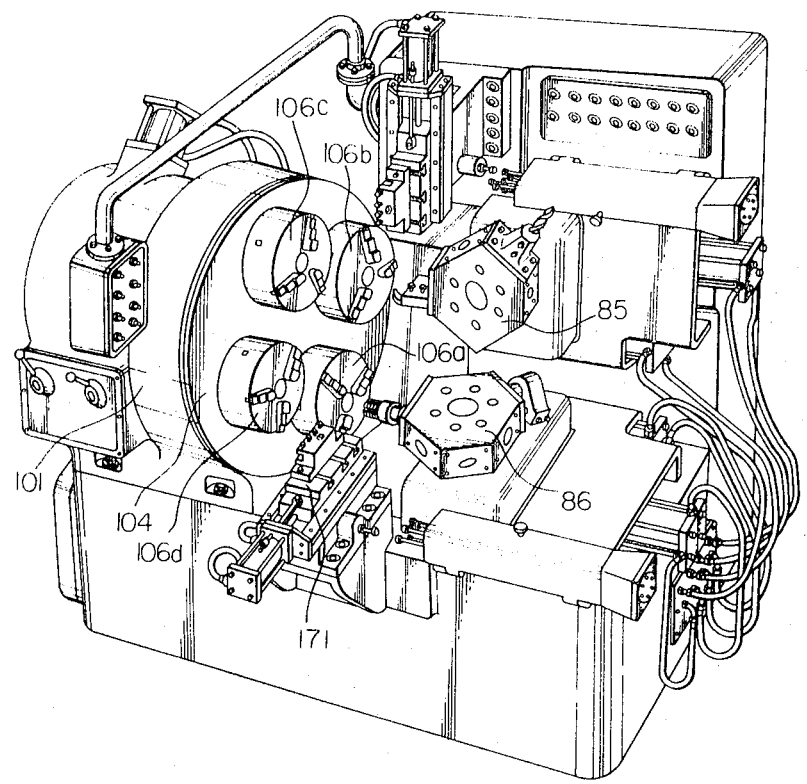
Figure 9:
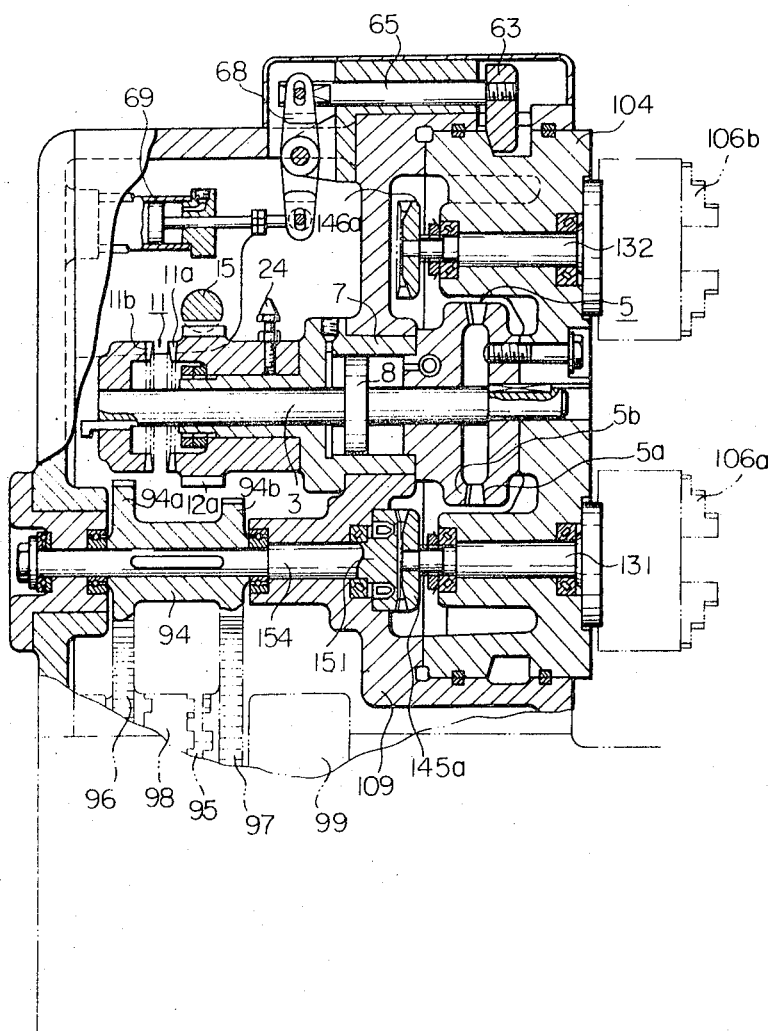
Figure 10:
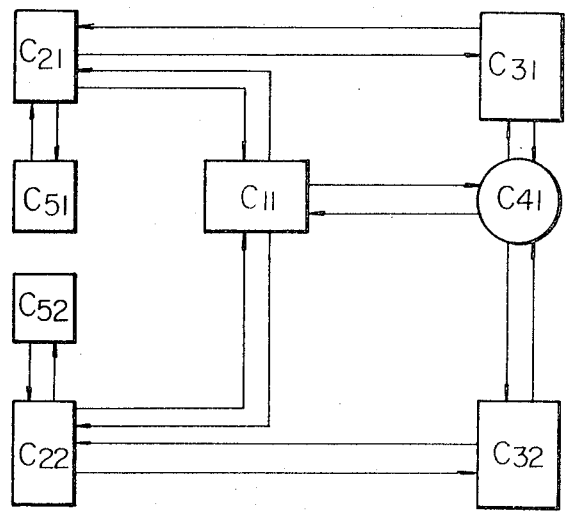
Figure 11:
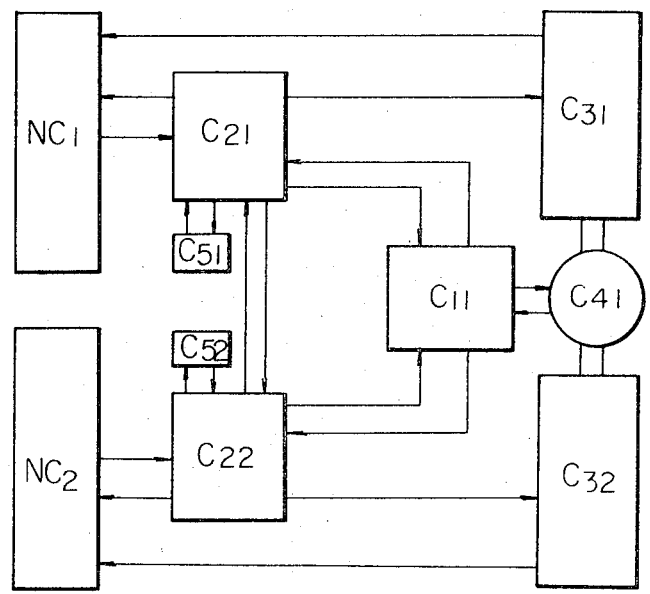

FIG. 7 is a block diagram of a control system used for the lathe shown in FIG. 1, FIG. 8 is an entire perspective view of the inventional turret lathe embodied in the form of a horizontal turret lathe, FIG. 9 is an enlarged sectional view of an internal structure of the head stock of the lathe shown in FIG. 8, FIG. 10 is a block diagram of a control system used for the lathe shown in FIG. 8, FIG. 11 is a block diagram of a control system modified from the one shown in FIG. 10.

Referring to FIGS. 1 to 4, a typical example of the invention in the form of a vertical turret lathe is shown. Aside from the head stock 1 and its related parts, all other mechanical parts are structured and arranged as in the conventional vertical turret lathe. Disposed directly above the work holding face of the head stock 1 is a turret tool post 70. Disposed adjacent to the work holding face of the head stock 1 is a side cutting head 71 for cutting of the side faces of the work. Partly encircling the work cutting station is a transparent deflector 72 made up of a plastic material which is automatically controlled as desired by a suitable known electric or pressure control mechanism not shown in the illustration. On the work holding face, the head stock 1 is provided with a turn table 4, which carries, on its work-holding face, a pair of face plates or chuck 6a and 6b. Axial centers of the face plates 6a and 6b are symmetric to each other about an axial center of the turn table 4. In the shown disposition, the face plate 6a is in the work cutting station and the face plate 6b is in a stand-by station (see FIG. 2). However, more than two face plates, for example three face plates 6a, 6b and 6c, can be provided on the turn table peripherally spaced from each other (see FIG. 3). In this case, axial centers of the respective face plates 6a, 6b and 6c fall on an imaginary circle concentric to the turn table 4 and one of the three face plates, for example the face plate 6a, is placed in the work cutting station whereas the remaining face plates 6b and 6c are placed in stand-by stations.

Referring to FIG. 4, there is shown an internal structure of the head stock 1 of the two face plates type such as shown in FIG. 2. A vertical main shaft 3 upheld by a bearing 2 is axially rotatable and slidable. At an upper end of the main shaft 3, an upper gear 5a is keyed to the main shaft 3 and is downwardly accompanied with a lower gear 5b engaging the upper gear 5a. The upper gear 5a is connected to the turn table 4 by set screws in concentric arrangement with the main shaft 3. The upper and lower gears 5a and 5b establish a friction gear 5. As is seen from FIGS. 5A and 5B, the meshing faces of the gears 5a and 5b are provided with radial teeth formed along their peripheral fringes. When gears 5a and 5b mesh with each other, resultant backlash of all the teeth couplings offset each other and an extremely accurate coupling can result. The angular coupling error is estimated to be at most about 3 seconds. Downside of the lower gear 5b, a pressure cylinder 7 is secured encircling and spaced from the main shaft 3. In other words, the gear 5b forms one end of the internal cavity of the pressure cylinder 7, whose pressure mechanism is either a pneumatic pressure mechanism or an oil pressure mechanism. The downward extension of the cylinder 7 forms the the bearing 2 upholding the main shaft 3. Being contained within the internal cavity of the pressure cylinder 7 is a piston 8 secured to the main shaft 3 to effect the axial sliding of the main shaft 3. The cylinder 7 is provided with externally connecting ports 7a and 7b for the used pressure medium. Like the ordinary piston mechanism, the two ports 7a and 7b are formed on opposite sides of the piston 8. In the illustrated arrangement, the port 7b functions as the pressure medium inlet port connected to a not shown pressure source. The main shaft 3 extends through the pressure cylinder 7 in an air-tight fashion and, at its lower end, is provided with a fixedly and coaxially mounted lower clutch gear 11b. At a position downside of the pressure cylinder 7, a hollow cylinder 12 is rotatably inserted over the bearing 2. In order to prevent a downward movement of the cylinder 12, a nut 14 is threaded over a lower threaded end 13 of the bearing 2 and the shoulder of a downward internal cavity of the cylinder 12 abuts the nut 14. The cylinder 12 is provided with a peripheral gear 12a engaging a rack member 15 and, on its downside face, is provided with an upper clutch gear 11a.

Both clutch gears 11a and 11b form a friction gear clutch 11 in their engaged position, but are disengaged, as shown in FIG. 4, during the cutting operation. when the cutting operation is completed, the pressure medium is introduced into the pressure cylinder 7 via the port 7b and the piston 8 and the main shaft 3 are moved upwards. Due to this upward moving action, the turn table 4 is lifted from the position shown in FIG. 4 and clutch gears 11a and 11b are engaged to establish a friction gear clutch 11. Concurrently with this, the upper gear 5a is lifted and released from engagement with the lower gear 5b so as to cancel the friction gear 5. Should the rack member 15 cause a rotation of the cylinder 12 around the bearing 2 under this situation, the main shaft 3 is rotated also due to the friction gear clutch 11 established by the engagement of the clutch gears 11a and 11b. This rotation of the main shaft 3 effects a rotation of the turn table 4 secured by the upper gear 5a. After the turn table 4 has completed its rotation of a prescribed extent, the rack member 15 ceases its movement and the pressure medium is discharged out of the pressure cylinder 7 via the port 7b. The main shaft 3 then descends and the upper gear 5a again engaged the lower gear 5b to re-establish the friction gear 5 and the disengaged friction gear clutch 11 is.

As is clearly seen in FIG. 6, the peripheral gear 12a is engaged with rack 15a of the rack member 15, which extends in the direction tangential to a pitch circle of the peripheral gear 12a. One end of the rack member 15 is slidably received in a guide hole 17 formed through a framework 9 of the apparatus the other end thereof is connected to an actuator 18 for controlling the longitudinal reciprocation of the rack member 15. The first mentioned end of the rack member 15 is provided with an adjustable stopper bolt 21, which restricts of the rack member 15 when it abuts the inlet periphery of the hole 17. Secured to the rack member 15 is a stopper bracket 22. As the rack member 15 slides towards the hole 17, this stopper bracket 22 abuts against an adjustable stopper bolt 23 threaded through the framework 9 and disposed parallel to the reciprocation of the rack member 15 so as to restrict the movement of the rack member 15 towards the hole 17. Therefore, the rack member 15 performs longitudinal reciprocating movement of an adjustably limited stroke. In other words, the turn table 4 performs a rotation of an adjustably limited extent.

The longitudinal reciprocation, that is, the movements in directions shown with arrows A and B in the drawing, is effectuated by the actuator 18. When the friction gear clutch 11 is engaged, the rack member 15 is moved in the direction A whereas, when the friction gear clutch is disengaged, the rack member 15 is moved in the direction B. This latter movement rotates the cylinder 12 to its initial angular position. Therefore, the turn table 4 carries out a rotation of a limited extent always in a single direction. However, when the single directional rotation of the turn table 4 is not required, the actuator 18 need not function in the above-explained fashion. For the purpose of detecting the extent of the rotation of the turn table 4, a dog 24 is disposed radially through the cylinder 12 and, in accordance with this, a limit switch 25 is secured to the framework 9 in an arrangement to be operated by the dog 24 upon rotation of the cylinder 12 (see FIGS. 4 and 6).

As is seen from FIG. 4, the turn table 4 is provided, on its work upholding side face with a pair of face plates 6a and 6b located symmetrically about a rotational axis of the turn table 4. The face plates 6a and 6b are fixed to flanges 31a and 32a of downwardly extending straight rotational shafts 31 and 32, respectively. Both shafts 31 and 32 are accompanied by roller bearings 36 to 39 and are rotatably mounted through the bearing parts 34 and 35 of the turn table 4. Downside parts 41 and 42 of the bearing parts 34 and 35 are provided with set nuts 43 and 44 for rotatably upholding the shafts 31 and 32. Downside ends of the shafts 31 and 32 fixedly carry upper clutch gears 45a and 46a, respectively. In axial alignment with the center of the turret tool post 70, a lower clutch gear 51 is located in such an arrangement that either of the clutch gears 45a or 46a is meshable therewith when either of the face plates 6a or 6b is in the cutting station. The lower clutch gear 51 is downsidely accompanied with an electro-magnetic clutch device 52 for ascertaining a steady meshing engagement of the clutch gaear 51 with either of the upper clutch gears 45a and 46a. The above-mentioned meshing engagement is effected concurrently with the meshing engagement of the friction gear clutch 5. A downward extension of the clutch gear 51 forms a shaft 54 rotatably supported by a bearing 53 of the framework 9. In the bearing 53, the shaft 54 is supported by a pair of roller bearings 55 and 56 and a set nut 58 is provided about a downward threaded portion 57 of the shaft 54 so as to ensure a smooth rotation of the shaft 54. At the lower end of the shaft 54, a bevel gear 59 is secured with another bevel gear 61 mounted firmly on a drive shaft 62 connected to a, not shown, known driving source. The drive shaft 62 is so designed that it starts its rotation upon reception of a signal informative of the engagement of the upper clutch gear 45a or 46a with the lower clutch gear 51 and this rotation effects a corresponding rotation of the face plate 6a or 6b via the elements 61, 59, 54, 51, 45a or 46a and 31 or 32.

As is already mentioned, establishment of the friction gear 5 is carried out in an extremely precise fashion. However, in order to bring about a further enhanced precise fashion of the clutch engagement, a special arrangement for fastening the turn table angular position such as mentioned below may be employed. In that arrangement, a brake-shoe 63 is disposed within the head stock 1 in a pressure contact with a shoulder 64 of the turn table 4 so as to prevent any possible small movement of the turn table 4 in position. The brake-shoe 63 is secured to a top of an upright shaft 65 which is mounted to the framework 9 in an axially slidable arrangement. A downward end of the shaft 65 is provided with a pin 65a received within an elongated hole 68a formed through one end of a lever 68, which is pivoted to the framework 9. Another end of the lever 68 has an elongated hole 68b also, which hole 68b receives a pin 66a formed at an upward end of a piston rod 66. Downward end of the piston rod 66 is provided with a piston 69a received within a pressure cylinder 69 secured to the framework 9. The pressure cylinder 69 is provided with ports 69a and 69c for a pressure medium located on different sides of the piston 69a. When the pressure medium is introduced into the pressure cylinder 69 via the port 69b, the piston 69a is lowered and the lever 68 pivots clockwise in the drawing about its pivotal support 67. This pivoting accompanies lifting of the brake-shoe 63 apart from the shoulder 64 via the upright shaft 65 and the turn table 4 is released from the restriction against its movement. On the other hand, when the pressure medium is introduced into the pressure cylinder 69 via the port 69c, the piston 69a is lifted and the lever 68 pivots counterclockwise in the drawing. This causes lowering of the brake shoe 63 so as to resume a pressure contact with the shoulder 64 so as to brake a possible free movement of the turn table 4.

The vertical turret lathe according to the present invention operates in the following mode.

The face plate 6a is in the cutting station facing the turret tool post 70 and the side cutting head 71 as shown in FIG. 1. In this situation, both the turret tool post 70 and the side cutting head 71 are in the working positions. Upon completion of the cutting operation, both elements 70 and 71 return to their stand-by positions. Concurrently with this, the drive shaft 62 ceases its rotation (see FIG. 4), the electro-magnetic clutch device 52 is deenergized and the face plate 6a ceases its rotation. The pressure medium is introduced into the pressure cylinder 69 via the port 69b and, as mentioned already, the brake-shoe 63 is released from its pressure contact with the shoulder 64 of the turn table 4. Next, the pressure medium is introduced into the pressure cylinder 7 via the port 7b so as to lift the main shaft 3. With this lifting of the main shaft 3, the turn table 4 is lifted and the friction gear 5 is disengaged. Concurrently with this disengagement, the lower friction gear clutch 11 is engaged and the turn table 4 is put in a turnable condition. Next, the actuator 18 shown in FIG. 6 moves the rack member 15 in the direction A and the turn table 4 is turned via elements 15a, 12, 11 and 3. When the cylinder 12 has turned by 180°, the dog 24 contacts the limit switch 25 to stop the sliding of the rack member 15, i.e. the turning of the turn table 4. The later explained control mechanism for governing the actuator 18 is so designed that it does not function when the cylinder 12 performs a reverse turning and the dog 2 comes in contact with the limit switch 25. Next, the pressure medium is again introduced into the pressure cylinder 7 but this time via the port 7a and the piston 8 is lowered. By this lowering of the piston 8, the turn table 4 is lowered also and the friction gear 5 is engaged. Concurrently with this engagement, the lower friction gear clutch 11 is disengaged and the upper clutch gear 46a of the face plate 6b engages the lower clutch gear 51. Next, the pressure medium is introduced into the pressure cylinder 69 via the port 69c and the brake-shoe 63 again comes into the pressure contact with the shoulder 64 of the turn table 4. After the turntable is locked, the actuator 18 shown in FIG. 6 pulls the rack member 15 into the direction B and the cylinder 12 resumes its initial angular position. Following this, the drive shaft 62 starts its rotation so as to rotate the shaft 54 via the elements 61 and 59. The electro-magnetic clutch device 52 is energized with a slight time lag for ascertaining a steady engagement of the clutch gear 46a with the clutch gear 51. Through this engagement, rotation of the shaft 54 is transmitted to the rotational shaft 32 and the face plate 6b carries out its rotation for the prescirbed cutting of the work held thereby. During the cutting operation on the work held by the face plate 6b now in the cutting station, the cut work held by the face plate 6a now in the stand-by station is replaced by new work.

Referring to FIG. 7, a control system for carrying out the above-described sequential operational steps is shown. When the purposed cutting operation is completed, both the turret tool post 70 and the side cutting head 71 return to their stand-by positions. A signal informative of these elements returning is given to a tool control part $C_{21}$ so as to switch it off. This switching-off of the tool control part $C_{21}$ is further transmitted to a turn table control part $C_{11}$ so as to switch it on. This switching-on of the turn table 4 is followed by the above-mentioned stoppage of the drive shaft 62. After the face plate 6b now in the cutting station starts its rotation, the tool control part $C_{21}$ is switched on for the subsequent cutting operation. In the illustrated control system, $C_{21}$ is an operation terminal for the cutting tools, $C_{41}$ is an operation terminal for the turn table 4 and $C_{51}$ is a part for manual operations on the respective elements of the control system.

The embodiment shown in FIGS. 2 and 4 is provided with a pair of face plates located symmetrically with respect to the rotational center of the turn table 4. While the work upheld by the face plate in the cutting station is subjected to the purposed cutting operation, the cut work upheld by the face plate in the stand-by station is replaced by new work. By the 180° turning of the turn table, the new work is brought to the cutting station for the subsequent cycle of the cutting operation.

As briefly mentioned already, the number of face plates can be increased as desired, provided that they are arranged with equal center angle intervals with respect to the rotational center of the turn table 4. In this sense, the embodiment shown in FIG. 3 is desirably adopted when the length of the time for the work replacement is shorter than the length of the time for one cycle cutting operation. arrangement, this arrangemnt, the number of machines per operator can be remarkably increased. Further, this embodiment is used in such a fashion that the first station is for cutting, the second station is for the cut work detaching and the third station is for the new work supply.

Referring to FIG. 8, there is shown another embodiment of the invention, which is given in the form of a horizontal turret lathe. In the shown lathe, the turn table 104 is provided with four face plates 106a to 106d and two turret tool posts 85 and 86 are provided. In the vicinity of the cutting station, a side cutting head 171 is arranged also as in the case of the aforementioned vertical turret lathe.

Internal structure of the head stock 101 is shown in FIG. 9, being different from the foregoing embodiment and the turn table 104 is arranged with its central axial line directing horizontally and holds four face plates 106a to 106d at constant center angle intervals about its axial center. In the shown arrangement, only two of the four face plates 106a and 106b are illustrated with chain-and-dot lines. The face plates 106a and 106b are accompanied with inwardly extending rotational shafts 131 and 132 fixed thereto, respectively. The shafts 131 and 132 are, at their inner ends, provided with clutch gears 145a and 146a fixed thereto, respectively. In the illustrated situation, the clutch gear 145a of the shaft 131 meshes with a clutch gear 151 fixedly mounted on a shaft 154, which is rotatably mounted in the framework 109 via bearings. At a further inner portion, the shaft 154 firmly carries a driven gear 94. The driven gear 94 possesses two teeth portions 94a and 94b of different diameters. Both teeth portions 94a and 94b mesh with gears 96 and 97 of different diameters, respectively. Both gears 96 and 97 are freely mounted on a driving shaft 94 in a spaced alignment. Disposed between and spaced from the gears 96 and 97 is a clutch member 98 keyed to the shaft 95, in an axially slidable arrangement and connected to a driving motor 99. By this differential gear arrangement, the shaft 154 can be rotated at two different speeds. Remaining parts of this embodiment are substantially the same with those of the foregoing embodiment in their structure, arrangement and function. Therefore, these portions are indicated with reference numerals the same with those used in the foregoing embodiment.

The operational feature of this embodiment is substantially the same as that of the foregoing embodiment. But, because this lathe is provided with four sets of face plates and two sets of turret tool posts, various modes of cutting operations can be effectively designed as follows.

When the time necessary for one cycle of a cutting operation does not exceed the time necessary for replacement of a cut work with a new work, two face plates upholding the respective works are positioned in the cutting stations and the remaining two face plates are positioned in the standby stations. One of the latter two face plates is subjected to removing the cut work and another of the latter two is subjected to mounting the new work. Meanwhile, the works upheld by the two face plates in the cutting stations are subjected to the respective cutting operations by the turret tool posts 85 and 86. After one cycle of the cutting operation is completed, the turn table 104 carries out a 90° turning.

When both surfaces, e.g. inner and outer surfaces, of the work has to be cut, one of the turret tool posts is engaged in the cutting of one surface whereas another of the turret tool posts is engaged in the cutting of another surface. During the cutting, the remaining two face plates are subjected to the exchange of the works. After completion of one cycle cutting, the turn table 104 carries out a 180° turning for next cutting operation.

When the time necessary for replacement of the work is shorter than one-third of the time necessary for one cycle of cutting operation, only one of the four face plates is positioned in the cutting station and the others in the stand-by stations.

A control system for this embodiment is shown in FIG. 10, wherein the system further involves a tool control part $C_{22}$ and an operation terminal for cutting tools $C_{32}$. Further, both tool-control part $C_{21}$ and $C_{22}$ can be accompanied with NC parts as shown in FIG. 11.

What is claimed is:

1. In a multi-spindle automatic lathe: a head stock; a turntable rotatably and reciprocally mounted on said head stock and having means defining a plurality of apertures therethrough; reciprocating means for reciprocating said turntable between a projected position and a working position relative to said head stock, said means comprising a rotatable shaft connected to said turntable, means defining a chamber enclosing and spaced from a portion of said shaft, a piston secured to said shaft and movably disposed in said chamber, and actuating means for reciprocably moving said piston within said chamber thereby recirpocating said shaft and said turntable; turning means for turning said turntable in said projected position comprising a rod having teeth along its axial length, a gear connected to said shaft and engaging the teeth of said rod, and a actuator connected to said rod for reciprocally moving said rod thereby effecting rotation of said gear, said shaft and said turntable; locking means for locking said turntable when said turntable is in said working position comprising a first gear secured to said turntable and a second gear secured to said head stock, said first gear engaging said second gear when said turntable is in said working position thereby locking said turntable to prevent rotation, and said first gear being disengaged from said second gear when said turntable is in said projected position thereby unlocking said turntable for rotation; a plurality of chucks disposed on said turntable each disposed in alignment with one of said apertures extending through said turntable; a plurality of chuck shafts rotatably connected to said turntable, each of said chuck shafts extending through one of said apertures and having one end connected to one of said chucks for effecting rotation thereof when said chuck shaft rotates and having a gear connected to the other end thereof; rotating means for rotating said chuck shafts comprising a first rotatable shaft having a gear at one end thereof, a second rotatable shaft having a gear at one end engaging the gear of said first rotatable shaft and having clutching means at the other end thereof for engaging the gears of said chuck shafts when said turntable is in said working position and disengaging the gears of said chuck shafts when said turntable is in said projected position, and motive force means for developing a motive force for effecting rotation of said first rotatable shaft thereby effecting rotation of said second rotatable shaft by their engaging gears; whereby said second rotatable shaft effects rotation of one of said chuck shafts and one of said chucks when said clutching means engages the gears of one of said chuck shafts.

2. In a multi-spindle automatic lathe according to claim 1: including another locking means for locking said turntable when said turntable is in said working position comprising a brake shoe disposed to contact a portion of said turntable when said turntable is in said working position, a reciprocating rod connected at one end to said brake shoe, a lever pivotally connected to said head stock and having one end connected to said rod, a reciprocally mounted shaft connected to the other end of said lever and having a piston connected at one end, means defining a chamber enclosing and spaced from a portion of said shaft and having said piston disposed therein, and actuating means for reciprocally moving said piston within said chamber thereby effecting reciprocation of said shaft and pivotal movement of said lever, whereby pivotal movement of said lever effects reciprocation of said rod thereby effecting alternate displacement of said brake shoe into frictional engagement with said turntable to lock said turntable or displacement of said brake shoe out of engagement with said turntable to unlock same.

3. In a multi-spindle automatic lathe: a head stock; a rotatable turntable reciprocally mounted on said head stock to reciprocate between a projected position and a seated position relative to said head stock; a plurality of rotatable chucks rotatably disposed on said turntable; indexing means engageable with said turntable when same is in said projected position for effecting turning indexing movement of said turntable to selectively index said chucks to a work position; rotating means engageable with one of said chucks when same is in said work position for effecting rotation thereof when said turntable is in said seated position; first clutching means actuatable to a clutched state in response to movement of said turntable to said seated position for effecting engagement of said rotating means and one of said chucks when the latter is in said work position and actuatable to a declutched state for effecting disengagement of same in response to movement of said turntable to said projected position; second clutching means actuatable to a clutched state in response to movement of said turntable to said projected position for effecting engagement of said indexing means and said turntable and actuatable to a declutched state for effecting disengagement of same in response to movement of said turntable to said seated position; and actuating means for actuating said turntable to said seated position to effect actuation of said first clutching means to its clutched state simultaneously with actuation of said second clutching means to its declutched state and for actuating said turntable to said projected position to effect actuation of said first clutching means to its declutched state simultaneously with actuation of said second clutching means to its clutched state.

4. In a multi-spindle automatic lathe according to claim 3; including locking means for locking said turntable when same is in said seated position, said means comprising a first gear secured to said turntable and a second gear secured to said head stock, said first gear engaging said second gear when said turntable is in said seated position thereby locking said turntable to prevent rotation, and said first gear being disengaged from said second gear when said turntable is in said projected position thereby unlocking said turntable for rotation.

5. In a multi-spindle automatic lathe according to claim 4; including another locking means for locking said turntable when said turntable is in said seated position comprising a brake shoe disposed to contact a portion of said turntable when said turntable is in said seated position, a reciprocating rod connected at one end to said brake shoe, a lever pivotally connected to said head stock and having one end connected to said rod, a reciprocally mounted shaft connected to the other end of said lever and having a piston connected at one end, means defining a chamber enclosing and spaced from a portion of said shaft and having said piston disposed therein, and actuating means for reciprocally moving said piston within said chamber thereby effecting reciprocation of said shaft and pivotal movement of said lever, whereby pivotal movement of said lever effects reciprocation of said rod thereby effecting alternate displacement of said brake shoe into frictional engagement with said turntable to lock said turntable and displacement of said brake shoe out of engagement with said turntable to unlock same.

6. In a multi-spindle automatic lathe according to claim 3; wherein said actuating means comprises a shaft connected to said turntable, and means for effecting movement of said shaft relative to said head stock; wherein said first clutching means comprises one clutch gear connected to said chuck and another clutch gear connected to said rotating means, said one clutch gear and said another clutch gear being engaged when said first clutching means is in said clutched state and disengaged when said clutching means is in said declutched state; and wherein said second clutching means comprises a first clutch gear connected to said shaft, and a second clutch gear connected to said indexing means, said first clutch gear being engaged with said second clutch gear when said second clutching means is in said clutched state and being disengaged when said second clutching means is in said declutched state.

7. In a multi-spindle automatic lathe according to claim 6; wherein said means for effecting movement of said shaft comprises means defining a chamber enclosing and spaced from said shaft, a piston secured to said shaft and movably disposed in said chamber, and actuating means for reciprocally moving said piston within said chamber thereby effecting movement of said shaft and reciprocation of said turntable.

8. In a multi-spindle automatic lathe according to claim 3; wherein said indexing means comprises a rod having teeth along its axial length, a gear connected to said shaft and engaging the teeth of said rod, and an actuator connected to said rod for reciprocally moving said rod a predetermined distance thereby effecting rotation of said gear, said shaft and said turntable and indexing said chucks to said work position.

* * * * *